United States Patent [19]

Rosenberg

[11] Patent Number: 4,828,111
[45] Date of Patent: May 9, 1989

[54] CONTAINER FOR HOLDING PACKAGES OF COVER GLASS AND INDIVIDUAL GLASS SLIDES

[75] Inventor: James H. Rosenberg, Wellesley, Mass.

[73] Assignee: Erie Scientific Company, Portsmouth, N.H.

[21] Appl. No.: 162,237

[22] Filed: Feb. 29, 1988

[51] Int. Cl.⁴ .............................................. B65D 1/36
[52] U.S. Cl. .................................................... 206/456
[58] Field of Search ....................... 206/454, 456, 459

[56] References Cited

U.S. PATENT DOCUMENTS

| | | | |
|---|---|---|---|
| 3,756,393 | 9/1973 | Markwitz et al. | 206/456 |
| 4,236,635 | 12/1980 | Namiki | 206/456 |
| 4,589,551 | 5/1986 | Hellon | 206/456 |

FOREIGN PATENT DOCUMENTS

| | | | |
|---|---|---|---|
| 248146 | 7/1966 | Austria | 206/459 |
| 597991 | 5/1960 | Canada | 206/456 |
| 635514 | 1/1962 | Canada | 206/456 |
| 787373 | 12/1957 | United Kingdom | 206/456 |

*Primary Examiner*—William Price
*Attorney, Agent, or Firm*—Marjama & Pincelli

[57] ABSTRACT

A container for initially holding a plurality of individual packages and later holding a plurality of slides in a spaced apart relationship. The container comprises a base portion having a receiving well and a top cover for mating with the base portion. The receiving well is designed so as to hold at least one box initially and later to hold a plurality of microscope slides placed therein.

17 Claims, 3 Drawing Sheets

CONTAINER FOR HOLDING PACKAGES OF COVER GLASS AND INDIVIDUAL GLASS SLIDES

The present invention is directed to a container for holding at least one package of cover glass, the container being capable of later being used to hold a plurality of individual glass slides in a spaced apart relationship.

BACKGROUND OF THE INVENTION

Cover glass is a thin individual piece of glass which is usually packaged in plastic or cardboard boxes containing 50 to 150 pieces. A plurality of these boxes, typically measuring 75 mm long×29 mm wide×29 mm high, are placed for shipping and storage in a cardboard box which is later discarded. Generally about ten boxes of cover glass are placed in a shipping box. Cover glass is used in research and clinical laboratories to cover a specimen on a microscope slide. A microscope slide is a glass substrate, typically 75×25 mm×1 mm thick. A single piece of cover glass is typically 22-24 mm wide, 22-60 mm long and 0.17 mm thick. The microscope slide, specimen, and cover glass assembly is frequently transported, stored or filed in slide files having slots for holding the microscope slides. These microscope slide files are typically made of wood or injection molded plastic and are relatively expensive. Added plastic parts are sometimes packaged in microscope slide boxes for reuse as slide files, but this increases the cost of microscope slides both for those who use them and those who do not.

Applicants have invented a container which can initially hold a plurality of packages of cover glass for shipment and storage and which later can be used to hold a plurality of microscope slides in an organized fashion in slots which may be numbered. The container is relatively easy to manufacture. Its cost should be no more than and probably less than the cardboard box it replaces.

SUMMARY OF THE INVENTION

A container for initially holding a plurality of individual packages and later holding a plurality of slides in a spaced apart relationship. The container comprises a base portion and a top cover. The base portion has at least one receiving well for ultimately holding packages or a plurality of slides. The top cover is configured so as to securely hold in position the packages or plurality of slides.

DETAILED DESCRIPTION

Figures 1, 1A:
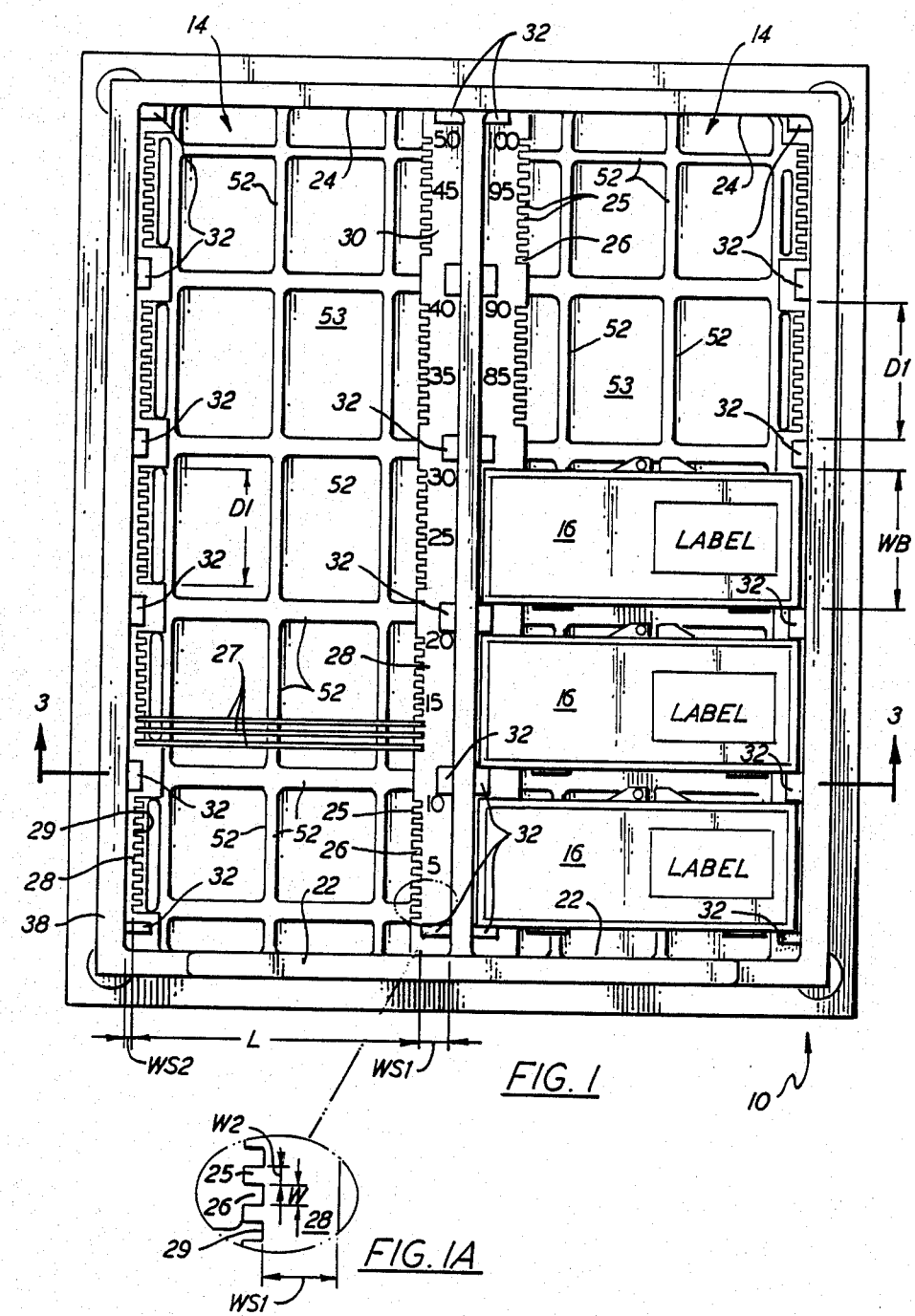
FIG. 1 is a top plan view of a container made in accordance with the present invention with the cover removed.
FIG. 1A is an enlargement fragmenting view of FIG. 1 as circled.

Referring to FIGS. 1 through 4, there is illustrated a container 10 made in accordance with the present invention. The container 10 comprising a base portion 12 and a top cover 13. In the particular embodiment illustrated, base portion 12 and top cover 13 are each made of a plastic material which is thermoformed. Base portion 12 is configured so as to have two receiving wells 14 placed adjacent to each other and separated by wall 15. Each receiving well 14 is designed to hold at least one box or container 16. In the particular embodimet illustrated, each receiving well 14 is capable of holding 5 boxes 16, each box 16 containing a plurality of cover glasses. However, only three boxes have been shown in FIG. 1 for the purpose of clarity. Each receiving well 14 comprises a pair of oppositely disposed side walls 18 connected by a bottom surface 20, a front wall 22 which connects the side walls 18 and bottom surface 20 and a back wall 24 which also connects side walls 18 and bottom surface 20. Each wall 18 is provided with a plurality of spaced projections 25 which form a plurality of slots 26 which are aligned with slots in opposing wall 18 in receiving well 14 so as to be capable of holding a plurality of microscope slides 27 in spaced apart relationship as shown in FIG. 1 on the left side. FIG. 1 illustrates boxes 16 and slides 27 in container 10 at the same time. This has been done merely to illustrate the features of the present invention. Normally, both wells 14 are initially filled with boxes 16 having cover glasses which are shipped to a purchaser where it is stored until needed. After the boxes 16 are taken out, the container 10 can be used to hold microscope slides. The particular width W of the slots 26 (see FIG. 1A) is selected as desired to hold the appropriate size glass slide, typically 1.3-1.5 mm and the back wall 29 of opposing slots 26 which hold a slide are spaced apart a distance L, typically from about 75-76 mm. The height H of projections 25 (see FIG. 3) need only be sufficient so as to prevent the microscope slides from falling over. The projections 25 are spaced apart a distance W2 so that a specimen cover glass and microscope slide assembly will not touch the adjacent microscope slide assembly. In the particular embodiment illustrated, projections 25 each have a height H of about 5 mm and a width W2 (see FIG. 1A) of about 3 mm.

In the particular embodiment illustrated, a support portion 28 is provided which extends from projections 25 to adjacent side walls 18 and has a width WS1. The support portion 28 adjacent the outerwall has a smaller width WS2. A sponge cushion 33 is disposed between boxes 16 and bottom surface 20 to help cushion the boxes from damage that can result from rough handling. Preferably, the cushion 33 has a thickness slightly greater than the heigt H. Sponge cushions 33 my be omitted if desired. Support portion 28 has a substantially flat top surface 30 for supporting boxes 16 and preferably has a height H that is the same as projections 25. Top surface 30 is provided with a plurality of raised spacers 32 (see FIG. 1) for separating and securely holding in position boxes 16. The spacers 32 extend above surface 30 and are spaced apart a distance D1 such that the boxes 16 of width WB will fit securely between spacers 32. It is, of course, understood that the spacers 32 may be provided in any width and height so as to receive a box 16 of any predetermined size. In the particular embodiment illustrated, raised spacers 32 has a height above surface 30 of about 0.25 inches and a width WS of about 0.5 inches. while in the preferred embodiment, raised spacers 32 are provided, they may be omitted if so desired.

In the preferred embodiment, support portions 28 are provided, however, support portion 28 may be omitted if desired. In such case, the spacers 32 may be provided directly on the top of projections 25 or on bottom surface 20 between projections 25 if the boxes 16 are placed between the projections 25.

In the embodiment illustrated, top surface 30 is also provided with indicia means for identifying the positions of the slots. In the particular embodiment illustrated, this is accomplished by providing numerals molded in top surface 30 which correspond to the number of slots provided. In the particular embodiment illustrated, numerals are provided every five slots. It is of course understood that any desired numbering or other identification system may be used as desired. In the particular embodiment illustrated, ten (10) individual slides are held between every spacer 32 thereby providing 50 slots for receiving slides 27. However, any desired number of slots 26 may be provided in receiving well 14. The well 14 on the left side has indicia means for identifying slots 26 therein from 1 to 50 and the receiving well on the right side is provided with indicia means for identifying slots 26 therein from 51 to 100. Accordingly, the base of portion 12 is designed to hold 100 individual microscope slides.

The bottom surface 20 is preferably provided with a plurality of ridges 52 for supporting the bottom edge of the microscope slide to be placed therein. These ridges 52 provide spaces 53 there between for receiving any excess moisture that may be associated with the slides placed therein. Ridges 52 also provide rigidity to the container 10, and cushion the slides filed in the container 10. Ridges (not shown) similar to ridges 52 may be placed on the inside surface of cover 13; in such case the ridges in the covers perferably align with the ridges 52 to provide for stable interlocking when a plurality of containers are stacked on each other.

Figure 2:
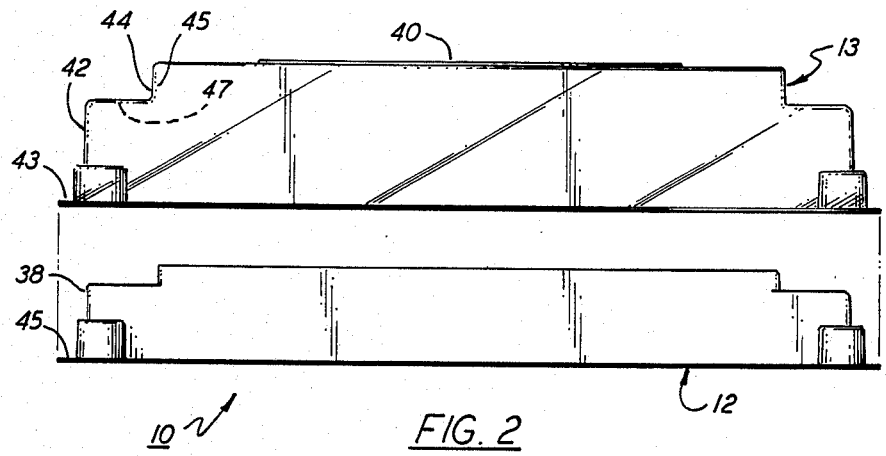
FIG. 2 is a front plan view of the container of FIG. 1 with the cover in the nonengaged position.
Figure 3:
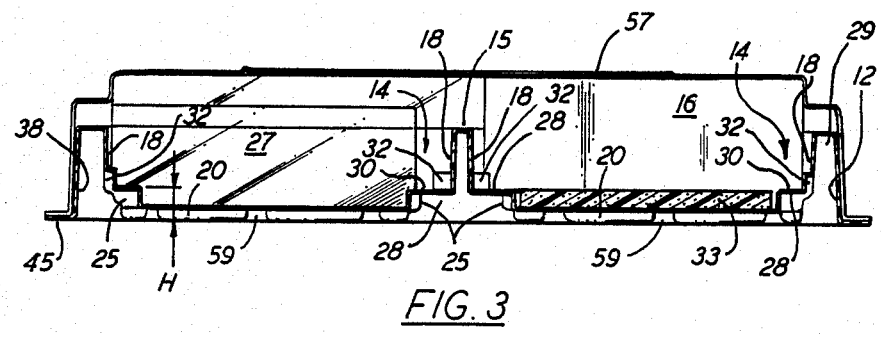
FIG. 3 is a cross-sectioned view of the container of FIG. 1 taken along line 3—3 of FIG. 1 with the cover in place.
Figure 4:
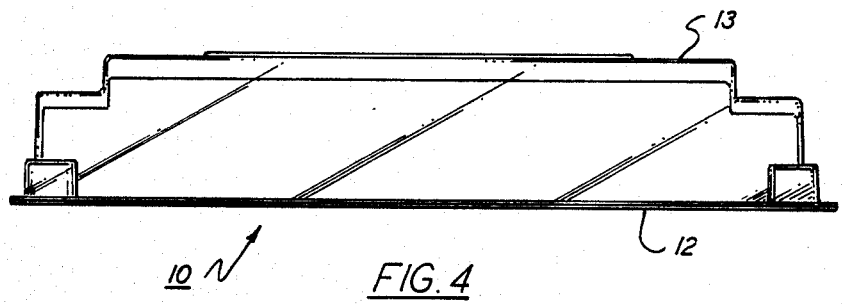
FIG. 4 is a front plan view of the container of FIG. 1 with the cover securely in place.

Referring to FIGS. 2, 3 and 4, there is illustrated a cover 13 which is designed to mate with the outside surface 38 of base portion 12. Top cover 13 comprises of a top surface 40 which terminates at its outer edge in an outer peripheral wall 42 which mates with the peripheral outer wall 38 of base portion 12. The bottom end of wall 42 is provided with a lip 43 which is designed to mate with shoulder 45 on base portion 12. In the particular embodiment illustrated, the outer wall 42 is provided with a indentation portion 44 having an inside vertical wall 45 for mating with the outside surface of boxes 16 and an inside top horizontal wall 47 for mating with the top of the microscope slides which are placed within the receiving well 14. The indentation portion 44 may vary in size to accommodate the appropriate size boxes and microscope slides that will ultimately be held in receiving well 14. The container 10 will hold in position boxes 16 during shipping and storage and the microscope slides will be held firmly in place when they are stored therein.

In order to further enhance the storage life of the cover glasses during shipping and storage, a shrink wrap may be placed around the container to minimize any moisture entering the container. The top cover 13 is preferably made of a clear or transparent material so that labels placed on boxes 16 can be viewed there through without the need for removing the cover 13. The top surface 40 cover portion may also be provided with a ridge 57 for interlocking with a corresponding shared recess 59 in the base portion 12 for stable stacking.

Figure 5:
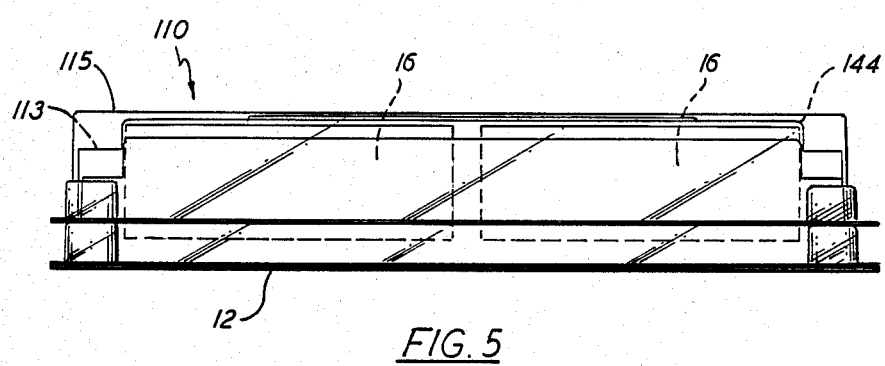
FIG. 5 is a front plan view of a modified container made in accordance with the present invention having one cover for placing over packages of cover glass and one cover for placement over microscope glass slides.
Figure 6:
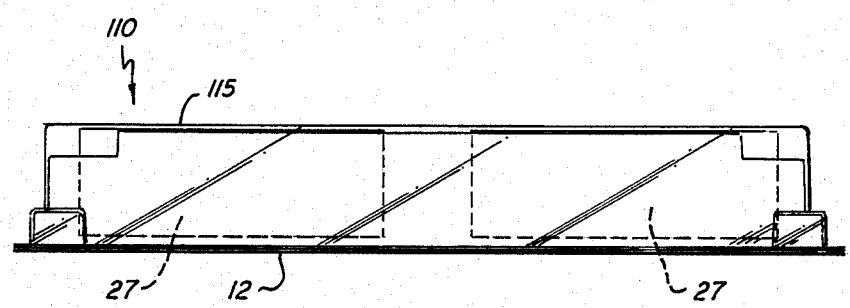
FIG. 6 is a front view of the container of FIG. 5 with the cover for holding packages of cover glass removed and the cover for securing microscope slides secured on the base portion.

Referring to FIGS. 5 and 6 there is illustrated a modified container 110 similar to the container 10 of FIGS. 1 through 4 except that two individual covers 113 and 115 are provided for mating with base portion. Like numerals illustrated in FIGS. 5 and 6 indicate like parts as illustrated in FIGS. 1 through 4. In this particular embodiment, the cover 113 is designed so that it has an inner wall 144 for mating with outer surface of boxes 16 during initial shipment. A second cover 115 is provided which mates with the outer surface of cover 113 during initial shipping and storage and which can also mate with the base portion 12 as illustrated in FIG. 6 for holding in position glass slides after the boxes 16 have been removed. Therefore, during initial shipment cover 113 will engage boxes 16 and base 12. After the boxes 6 have been removed and slides 27 placed in slots 25, the cover 115 may be used. In this way microscope slides having a size substantially different than the boxes can be used with relatively simple cover designs.

It is to be understood that various changes and modifications may be made in the present invention without departing from the scope thereof. The scope of protection being defined by the attached claims.

What is claimed is:

1. A container for initially holding a plurality of individual packages and later holding a plurality of slides in spaced apart relationship, each of said packages containing a plurality of pieces of glass, said container comprising:

a base portion having a peripheral outer wall and at least one receiving well having a bottom surface, a pair of oppositely disposed side walls connected to said bottom surface, a front wall connected to said bottom surface and to said side walls and a back wall disposed oppositely from said front wall connecting said side walls and bottom surface, each of said receiving wells including means for holding at least one of said packages of alternatively holding a plurality of slides in spaced apart relationship;

a cover having a top surface and a peripheral outer wall for mating with the peripheral outer wall of said base portion, said cover including means for holding in position said packages or said slides when placed in mating relationship with said base portion.

2. A container for initially holding a plurality of individual packages and later holding a plurality of slides in spaced apart relationship, each of said packages containing a plurality of pieces of glass, said container comprising:

a base portion having at least one receiving well, said receiving well having a bottom surface, a pair of oppositely disposed side walls connected to said bottom surface, a front wall connected to said bottom surface and to said side walls and a a back wall portion disposed oppositely from said front wall connecting said bottom surface and side walls, said receiving well including means for alternatively holding said packages or said plurality of slides;

a first cover having a top surface and a peripheral outer wall for mating with the peripheral wall of said base portion, said first cover including means for holding in position said plurality of individual packages when placed in said receiving well;

a second cover having a top surface and a perpheral outer wall for mating with the peripheral wall of said base portion, said second cover including means for holding in position said plurality of individual slides when place in said receiving well.

3. A container for initially holding a plurality of individual packages and later holding a plurality of slides in a spaced apart relationship comprising:

at least one package containing a plurality of pieces of cover glass;

a base portion having at least one receiving well, said receiving well having a bottom surface, a pair of oppositely disposed side walls connected to said bottom surface, a front wall connected to said bottom wall surface and to said side walls, and a back wall portion disposed oppositely from said front wall, said receiving well including means for alternatively holding said packages or said plurality of slides;

a cover having a top surface and peripheral outer wall for mating with the base portion said cover including means for holding in position a plurality of said packages or alternatively, a plurality of slides placed in said receiving well.

4. A container according to claim 1 wherein said receiving well means includes the bottom surface of said receiving well for supporting said packages or said plurality of slides placed within said receiving well.

5. A container according to claim 1 wherein said receiving well means includes the bottom surface of said receiving well and is provided with a raised portion adjacent to each sidewall for supporting said individual packages.

6. A container according to claim 1 wherein said receiving well means includes the bottom surface of said receiving well and is provided with a plurality of aligned receiving slots adjacent to both said sidewalls for holding in spaced apart relationship said plurality of slides.

7. A container according to claim 5 wherein said raised portion is provided with a plurality of aligned slots for holding in spaced apart relationship said plurality of slides.

8. A container according to claim1 wherein said well is provided with indicia means for identifying the position of said plurality of slides placed in said receiving well.

9. A container according to claim 1 wherein two receiving wells are provided adjacent to one another and separated by a common wall.

10. A container according to claim 1 wherein said cover is made of a material which allows labeling on said individual packages to be viewed therethrough.

11. A container according to claim 1 wherein the base portion is provided with indicia means for identifying the position of said slides placed therein.

12. A container according to claim 1 wherein said receiving well means includes a plurality of spaced apart projections along each of said sidewalls for separating and holding in position said individual packages within said receiving well.

13. A container according to claim 1 wherein said receiving well means includes the bottom surface of said receiving well and is provided with means for supporting said packages placed in said receiving well above said bottom surface.

14. A container according to claim 2 wherein said second cover includes means for placement of said second cover on said first cover.

15. A container according to claim 3 wherein said receiving well means further comprises a first raised portion for supporting said packages.

16. A container according to claim 15 wherein said raised portion is provided with a plurality of spacers for holding one package between adjacent spacers in a secure manner.

17. A container according to claim 15 wherein said raised portion is provided with indicia means for identifying the position of said microscope slides.

* * * * *